Aug. 19, 1952  W. D. BRIGGS  2,607,270
DEPTH MEASUREMENT MICROSCOPE
Filed Aug. 29, 1949
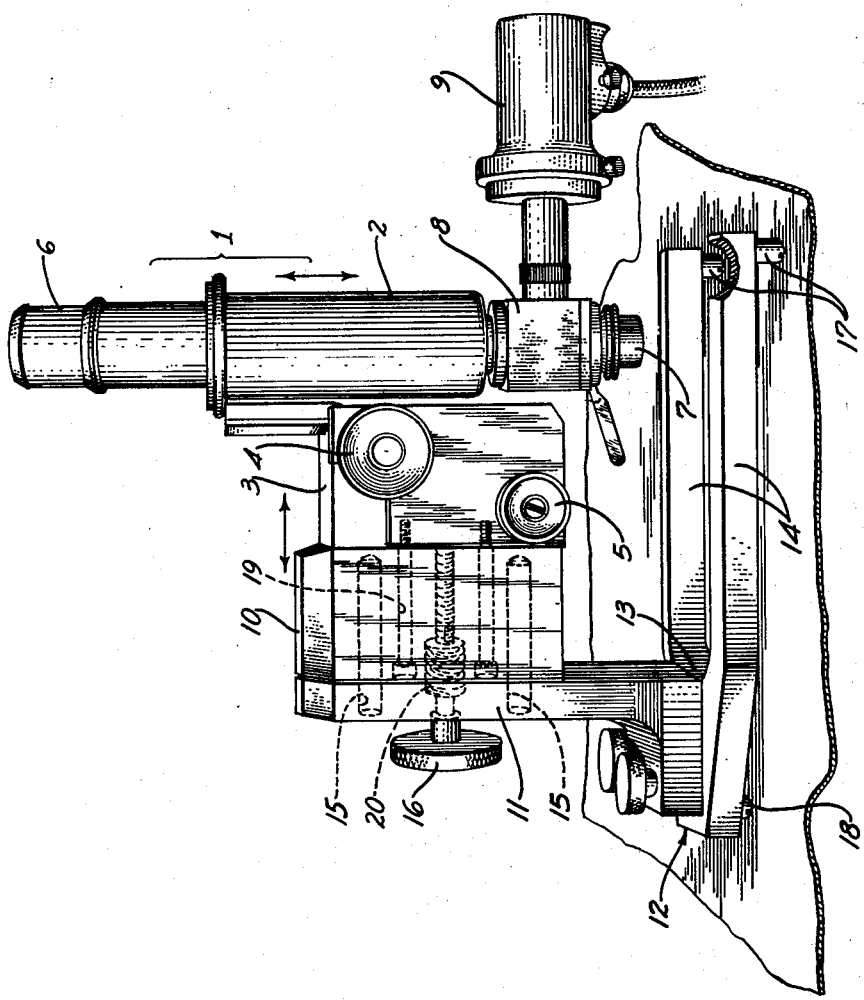
INVENTOR:
WILLIAM D. BRIGGS
BY Herbert E. Metcalf
ATTORNEY Patented Aug. 19, 1952

2,607,270

UNITED STATES PATENT OFFICE 2,607,270

DEPTH MEASUREMENT MICROSCOPE

William D. Briggs, Lawndale, Calif., assignor to Northrop Aircraft, Inc., Hawthorne, Calif., a corporation of California Application August 29, 1949, Serial No. 112,938

2 Claims. (Cl. 88—39)

My invention relates to depth measuring devices and more particularly to an optical means and method for accurately determining the depth of indentations such as surface scratches in opaque bodies.

Many modern airplanes utilize an all-metal construction wherein the external skin of the wings or other portions of the airplane is arranged to carry substantial loads. This type of construction is known as the stressed skin design. As airplane skins are customarily thin and are usually formed from aluminum alloy sheet, surface scratches, if they are deeper than certain predetermined maxima, can materially and deleteriously affect the strength of stressed skin structures.

It is therefore an object of the invention to provide a means and method of accurately measuring the depth of scratches in sheet material, such as, for example, metal skin sheets used in airplane construction.

Scratches can, of course, be accidentally made in sheet metal and in airplane construction at any stage in fabrication of parts. It is therefore highly desirable that any device for measuring scratch depth be portable and suitable for use on the metal sheets at any time.

It is another object of the present invention to provide a device for measuring scratch depth that is portable and which can be readily and easily applied to the surface of a metal sheet wherever such a sheet is exposed.

Briefly the invention utilizes a microscope containing an optical system having as little depth of focus as practical. This optical system is mounted on a base suitable for resting on an opaque surface. The microscope can be moved axially of the optical system for focussing and the fine focussing adjustment is calibrated. The microscope is also mounted on the base so that it can be moved along a line at right angles to the optical axis, without moving the base.

In use, the microscope is placed on the surface having a scratch therein, and the optical system is focussed on the bottom of the scratch. Then, without moving the base, the optical system is moved at right angles to the optical axis thereof until the operator can focus on the unscratched surface at the side of the scratch. The difference in focus as read from the calibrated fine focussing adjustment will give the depth of the scratch. In practice scratch depths can be measured with an accuracy of better than .001 inch.

The invention will be further understood by reference to the ensuing description of the appended drawing in which the figure is a lateral perspective view of one preferred apparatus for performing the method of the invention.

A microscope 1 of the usual metallurgical type is mounted with its tube 2 sliding in body 3, with the usual coarse adjustment screw 4 and fine adjustment screw 5. This latter screw 5 is calibrated in thousandths of an inch or in tenths of a millimeter, for example, with respect to the motion of tube 2 on body 3. The eye piece 6 and objective lens 7 of the microscope may be of the usual high quality type microscope lenses, but not of any type especially made to have a wide depth of focus. Standard metallurgical microscope lenses have been found to have a sufficiently small depth of focus to provide the desired measurement accuracy. As is customary when viewing surfaces of opaque objects, the tube 2 is provided with a surface illuminating prism (not shown) enclosed in prism case 8 with light supplied by a lamp (not shown) in lamp housing 9 attached to case 8.

Body 3 is fastened securely to a body block 10 by body screws 19, and the body block 10 extends at right angles from a standard 11 erected from a U-shaped base 12 at the junction 13 of the legs 14 thereof. Legs 14 extend laterally from standard 11 to terminate beyond the optical axis of the microscope, and are positioned so as to have the objective lens of the microscope midway between them.

The body block 10 is supported by and moveable laterally with respect to standard 11 on slide pins 15 under the control of a lateral adjustment screw 16 threaded into the block 10, in cooperation with a compression spring 20. The lead of this screw is made fine enough so that the scratch will remain in the microscope field during lateral adjustment. The ends of the legs 14 are each provided with a surface contact lug 17, and the junction 13 of the base 12 is also provided with a base lug 18 making a three point support for the base. All mounting elements of the microscope are carefully machined to provide a lateral motion of the microscope optical axis that is exactly at right angles to the plane defined by the surface contacting points of lugs 17 and 18 and thus to any flat surface on which the base 12 rests.

In use, the base 12 is placed to rest on the surface having a scratch or similar indentation therein whose depth is to be measured. Preferably the line of motion of the optical axis is arranged to be roughly a right angle to the extent of the scratch. The base is then moved on the surface until the scratch is in the microscope field and the lateral adjustment screw 16 is then operated, together with the coarse and fine focusing adjustment screws 4 and 5 until a focus on the bottom of the scratch is obtained. Then, without moving base 12 with respect to the surface, the lateral 16 and fine focus 5 screws are operated until a focus is obtained on the normal surface alongside and close to the scratch. The difference in readings of the fine adjustment screw 5 will then give the depth of the scratch. If desired, normal surface readings can be made on both sides of the scratch. It has been found in practice that a travel of 0.1 inch is sufficient for the lateral adjustment range of screw 16.

The depth measuring device as described has been found in practice to measure depths consistently to better than .001 inch and has been found to be an effective tool in determining whether or not scratches in stressed skins are sufficiently deep to affect the strength thereof. The device will not only measure scratch depths accurately in flat sheets but also can be used on surfaces having curvatures of long radii such as, for example, on upper or lower airplane wing surfaces. As scratches are usually only a few thousandths of an inch wide, the lateral motion of the optical axis during measurement with respect to the curved surface is so small that any deviation due to surface curvature is substantially smaller than the depth of focus of the microscope and thus less than the normal operating error of the device.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In the art of determining the depth of an indent in a surface, a portable, self-contained instrument comprising: a base including a three-point support for direct contact with the surface whereby said base is stably supported on said surface; an opening in the base adapted to be positioned over the area of said surface comprising the said indent; an upright carried by said base; a slide element mounted in said upright; a block supported by and movable on said slide element and extending laterally from said upright towards the opening in said base; a microscope optical system movably mounted on said block over the opening in said base; means for displacing the optical system vertically so as to bring the bottom of the indent into the focus of the microscope; screw means cooperating with said upright and said block and rotatable to move said block along said slide element, whereby the optical system can be moved laterally so as to be positioned over the portion of said surface adjacent said indent and said portion brought into focus; and graduation means associated with said displacement means for indicating the respective positions of the displaced optical system when the latter is focused on the bottom of the indent and the adjacent portion of the surface, whereby the depth of the indent can be determined.

2. In the art of determining the depth of an indent in a surface, a portable, self-contained instrument comprising: a base including a three-point support for direct contact with the surface whereby said base is stably supported on said surface; an opening in the base adapted to be positioned over the area of said surface comprising the indent; an upright carried by said base; a slide element mounted in said upright; a block supported by and movable on said slide element and extending laterally from said upright towards the opening in said base; a microscope optical system movably mounted on said block over the opening in said base; calibrated screw means for displacing the optical system vertically so as to bring the bottom of the indent into the focus of the microscope; screw means cooperating with said upright and said block and rotatable to move said block along said slide element to move the optical system laterally so as to be positioned over the portion of said surface adjacent said indent and said portion brought into focus, whereby the depth of the indent can be determined by a comparison of the readings of the calibrated screw means when the bottom of the indent and the adjacent portion of said surface are respectively brought into focus.

WILLIAM D. BRIGGS.

REFERENCES CITED

The following references are of record in the file of this patent:

UNITED STATES PATENTS

| Number | Name | Date |
|---|---|---|
| 1,424,941 | Pirwitz | Aug. 8, 1922 |
| 1,959,537 | Kuhne | May 22, 1934 |
| 2,437,775 | Williams | Mar. 16, 1948 |

FOREIGN PATENTS

| Number | Country | Date |
|---|---|---|
| 609,536 | Great Britain | Oct. 1, 1948 |

OTHER REFERENCES

Carpenter—Text—The Microscope—6th edition — pages 167, 168 — Published by J. & A. Churchill—London—1881—copy in Division 7.